United States Patent
Yang et al.

(10) Patent No.: US 8,090,665 B2
(45) Date of Patent: Jan. 3, 2012

(54) FINDING COMMUNITIES AND THEIR EVOLUTIONS IN DYNAMIC SOCIAL NETWORK

(75) Inventors: Tianbao Yang, East Lansing, MI (US); Shenghuo Zhu, Santa Clara, CA (US); Yun Chi, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 578 days.

(21) Appl. No.: 12/277,305

(22) Filed: Nov. 25, 2008

(65) Prior Publication Data
US 2010/0076913 A1 Mar. 25, 2010

Related U.S. Application Data

(60) Provisional application No. 61/099,593, filed on Sep. 24, 2008.

(51) Int. Cl.
*G06Q 99/00* (2006.01)
(52) U.S. Cl. .................................................. 705/319
(58) Field of Classification Search .................. None
See application file for complete search history.

(56) References Cited

OTHER PUBLICATIONS

"A framework for community identification in dynamic social networks," Chayant Tantipathananandh, Tanya B. Wolf, David Kempe, In Proceedings of the 13th ACM SIGKDD international conference on Knowledge discovery and data mining (2007), pp. 717-726.*
Zhu et al, Combining Content and Link for Classification using Matrix Factorization, SIGIR 2007 Proceedings, 2007.
Chi et al, Probabilistic Polyadic Factorization and Its Application to Personalized Recommendation, CIKM'08, Oct. 26-30, 2008, Napa Valley, California, USA.
FitzGerald et al, Non-Negative Tensor Factorisation for Sound Source Separation, ISSC, Sep. 1, 2005.
Lathauwer, A Multilinear Singular Value Decomposition, Siam J. Matrix Anal. Appl., vol. 21, No. 4, pp. 1253-1278.
Shashua, et al, Non-Negative Tensor Factorization with Applications to Statistics and Computer Vision, Proceedings of the 22d Int'l Conference on Machine Learning, Bonn, Germany 2005.

* cited by examiner

*Primary Examiner* — Jonathan Ouellette
(74) *Attorney, Agent, or Firm* — Bao Tran; Joseph Kolodka (57) ABSTRACT

Systems and methods are disclosed to find dynamic social networks by applying a dynamic stochastic block model to generate one or more dynamic social networks, wherein the model simultaneously captures communities and their evolutions, and inferring best-fit parameters for the dynamic stochastic model with online learning and offline learning.

20 Claims, 7 Drawing Sheets

FINDING COMMUNITIES AND THEIR EVOLUTIONS IN DYNAMIC SOCIAL NETWORK

The present application claims priority to Provisional Application Ser. No. 61/099,593 filed Sep. 24, 2008, the content of which is incorporated by reference.

BACKGROUND

As online social networks such as Facebook and MySpace gaining popularity rapidly, social networks have become an ubiquitous part of many people's daily lives. One major topic in social network analysis is the study of communities in social networks. For instance, in Wikipedia, the online social network service is defined as "A social network service focuses on building online communities of people who share interests and activities, or who are interested in exploring the interests and activities of others". Analyzing communities in a social network, in addition to serving scientific purposes (e.g., in sociology and social psychology), helps improve user experiences (e.g., through friend recommendation services) and provides business values (e.g., in target advertisement and market segmentation analysis).

Communities have long been studied in various social networks. For example, in social science an important research topic is to identify cohesive subgroups of individuals within a social network where cohesive subgroups are defined as "subsets of actors among whom there are relatively strong, direct, intense, frequent, or positive ties". As another example, communities also play an important role in Web analysis, where a Web community is defined as "a set of sites that have more links to members of the community than to non-members".

Social networks are usually represented by graphs where nodes represent individuals and edges represent relationships and interactions among individuals. Based on this graph representation, there exists a large body of work on analyzing communities in static social networks, ranging from well-established social network analysis to recent successful applications such as Web community discovery . However, these studies overlooked an important feature of communities—communities in real life are usually dynamic. On a macroscopic level, community structures evolve over time. For example, a political community whose members' main interest is the presidential election may become less active after the election takes place. On a microscopic level, individuals may change their community memberships, due to the shifts of their interests or due to certain external events. In this respect, the above studies that analyze static communities fail to capture the important dynamics in communities.

Recently, there have been a growing body of work on analyzing dynamic communities in social networks. Some of these studies adopted a two-step approach where first static analysis is applied to the snapshots of the social network at different time steps, and then community evolutions are introduced afterwards to interpret the change of communities over time. Because data in real world are often noisy, such a two-step approach often results in unstable community structures and consequentially, unwarranted community evolutions. Some more recent studies attempted to unify the processes of community extraction and evolution extraction by using certain heuristics, such as regularizing temporal smoothness. Although some encouraging results were reported, none of these studies explicitly model the transition or change of community memberships, which is the key to the analysis of dynamic social network. In addition, most existing approaches consider point estimation in their studies, i.e., only estimate the most likely value for the unknown parameters. Given the large scale of social networks and potential noise in data, it is likely that the network data may not be sufficient to determine the exact value of parameters, and therefore it is important to develop methods beyond point estimation in order to model and capture the uncertainty in parameter estimation.

Finding communities is an important research topic in social network analysis. For the task of community discovery, many approaches such as clique-based, degree-based, and matrix-perturbation-based, have been proposed. Wasserman et al. gave a comprehensive survey on these approaches. Community discovery is also related to some important research issues in other fields. For example, in applied physics, communities are important in analyzing modules in a physical system and various algorithms have been proposed to discover modular structures in physical systems. As another example, in the machine learning field, finding communities is closely related to graph-based clustering algorithms, such as the normalized cut algorithm proposed by Shi et al. and the graph-factorization clustering (GFC) algorithm proposed by Yu et al. However, all these approaches focused on analyzing static networks while the focus in this study is on analyzing dynamic social networks.

In the field of statistics, a well-studied probabilistic model is the stochastic block model (SBM). This model had been originally proposed by Holland et al. and have been successfully applied in various areas such as social science and bioinformatics. Researchers have extended the stochastic block model in different directions. For example, Airoldi et al. proposed a mixed-membership stochastic block model, Kemp et al. proposed a model that allows an unbounded number of clusters, and Hofman et al. proposed a Bayesian approach based on the stochastic block model to infer module assignments and to identify the optimal number of modules. The new model is also an extension of the stochastic block model. However, in comparison to the above approaches which focused on static social networks, the approach explicitly models the change of community membership over time and therefore can discovery communities and their evolutions simultaneously in dynamic social networks.

Recently, finding communities and their evolutions in dynamic networks has gained more and more attention. Asur et al. introduced a family of events on both communities and individuals to characterize evolution of communities. Tantipathananandh et al. proposed an optimization-based approach for modeling dynamic community structure. Chi et al. proposed an evolutionary version of the spectral clustering algorithms. They used graph cut as a metric for measuring community structures and community evolutions. Lin et al. extended the graph-factorization clustering (GFC) and proposed the FacetNet algorithm for analyzing dynamic communities.

SUMMARY

In one aspect, systems and methods are disclosed to find dynamic social networks by applying a dynamic stochastic block model to generate one or more dynamic social networks, wherein the model simultaneously captures communities and their evolutions, and inferring best-fit parameters for the dynamic stochastic model with online learning and offline learning.

In another aspect, a dynamic stochastic block model is used for modeling communities and their evolutions in a unified probabilistic framework. The framework has two versions, the online learning version that iteratively updates the probabilistic model over time, and the offline learning version that learns the probabilistic model with network data obtained at all time steps. This is in contrast to most existing studies of social network analysis that only focus on the online learning approaches.

In one embodiment, a Bayesian treatment is used for parameter estimation. In addition to social network analysis that computes the most likely values for the unknown parameters, the Bayesian treatment estimates the posterior distributions for unknown parameters, which is utilized to predict community memberships as well as to derive important characteristics of communities, such as community structures, community evolutions, among others.

Instead of an afterwards effect or a regularization term, community evolutions are modeled coherently together with communities themselves. Therefore, communities and their evolutions are captured in a unified model.

The system can learn the parameters in the dynamic stochastic block model by using Bayesian inference. In the inference framework, the following two steps are iteratively executed. First, the community of each individual at each time step is inferred and then the posterior parameters of the dynamic stochastic block model are updated.

From the learned model parameters, the system can derive important characteristics such as community structures, community evolutions, changes of individual community memberships, etc.

Advantages of the preferred embodiment may include one or more of the following. The process is highly efficient. The process is executed in an incremental fashion to minimize the computational cost. In addition, the process takes advantage of the sparseness of data. For each iteration, the process has a time complexity linear in the size of a social network provided the network is sparse. The system provides a rigorous probabilistic interpretation and can handle all frameworks including online learning frameworks. The model is advantageous in (a) achieving better accuracy in community extraction, (b) capturing community evolutions more faithfully, and (c) revealing more insights from the network data.

DESCRIPTION

Figure 1:
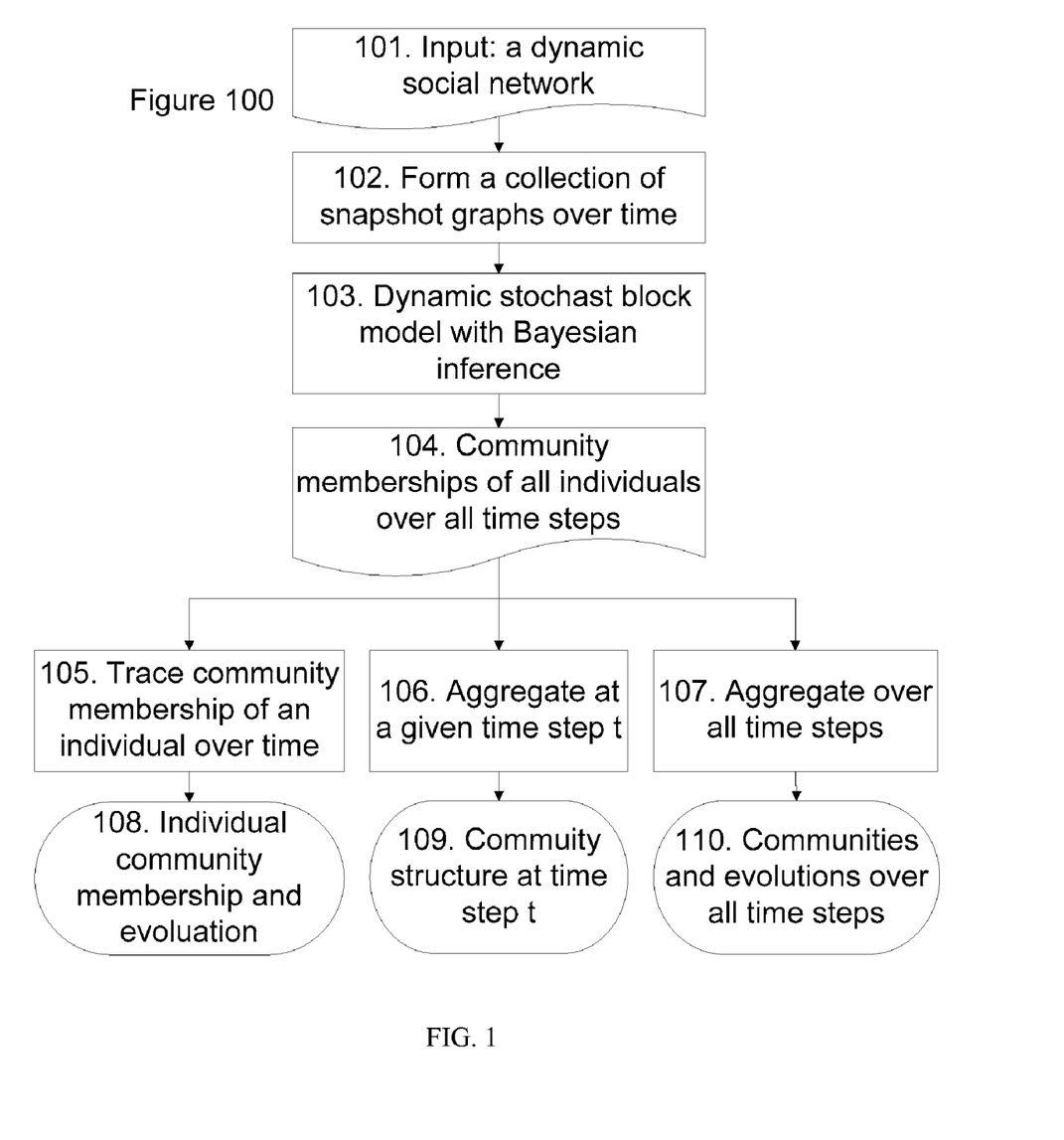
FIG. 1 shows an exemplary process that provides a unified framework for analyzing dynamic communities in social networks and for modeling both communities and their evolutions simultaneously.

The process of FIG. 1 provides a unified framework for analyzing dynamic communities in social networks and for modeling both communities and their evolutions simultaneously. The dynamics of communities are modeled explicitly by transition parameters that indicates the changes in community memberships over time. A Bayesian treatment of parameter estimation is used to avoid the shortcomings of point estimation by using the posterior distributions of parameters for membership prediction.

In one embodiment, a dynamic stochastic block model is used for modeling communities and their evolutions in a rigorous probabilistic framework. The framework has two versions. The first one is an online learning approach, where the community structure learned at time step t−1 are used together with the observed data at time step t to learn the community structure at time step t. The second version of the framework is an offline learning approach, where all available data are used to learn the community structures at all time steps simultaneously.

Turning now to FIG. 1, in 101, the input to the system is a dynamic social network that changes over time. Next, in 102, the process constructs a collection of snapshot graphs over time from the input data (101). The collection of snapshot graphs is denoted by $W_T = \{W^{(1)}, W^{(2)}, \ldots, W^{(T)}\}$, where $W^T$ corresponds to the adjacency matrix for the snapshot graph of the social network at time t. In 103, the process applies the dynamic stochastic block model and the Bayesian inference to the collection of snapshot graphs. This process is shown in more details in FIG. 2.

In 104, the process determines the most likely community membership of each individual at each time step. These are the output obtained by using the dynamic stochastic block model and the Bayesian inference algorithm (103).

In 105, the process traces and summarizes the community membership of a given individual. From 105, the process moves to 108 to determine individual community membership and evolution over time, which describe the pattern of an individual in the social network, obtained from 105.

Alternatively, in 106, an aggregation process is used to aggregate the individual community memberships at a given time step t into the community structure of the social network at time t. In 109, the process determines the community structure results from 106.

From 104, the process can proceed to 107 where an aggregation module aggregates the individual community memberships over all time steps into the communities and their evolutions of the dynamic social network. From 107, the process determines the communities and their evolutions in 110.

Figure 2:
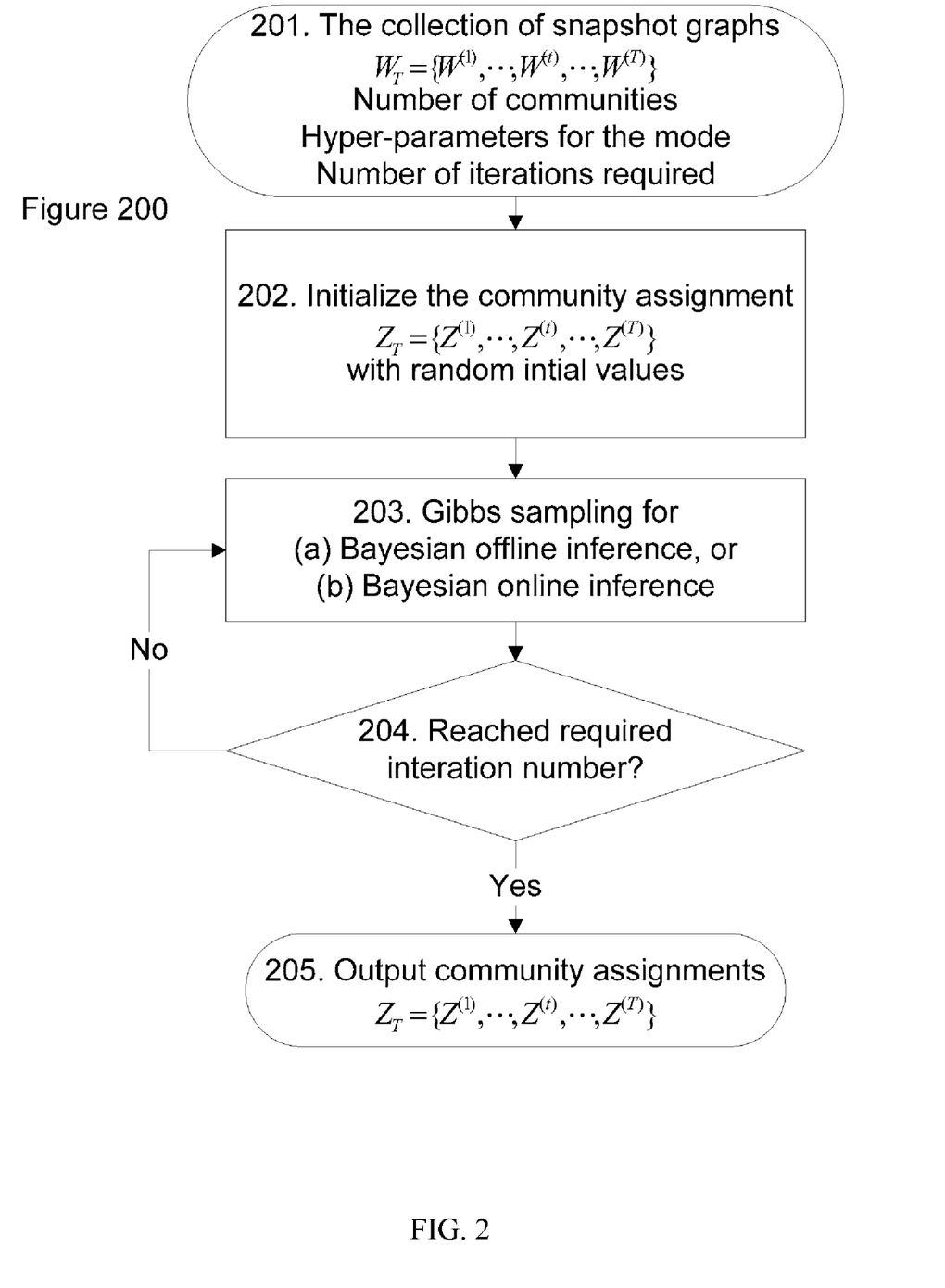
FIG. 2 shows an exemplary process to the collection of snapshot graphs.

Turning now to FIG. 2, in 201, a collection of snapshot graphs that describe the dynamical social network over all time steps from 1 to T is retrieved. In 202, the community memberships are assigned to some random initial values. In 203, a Gibbs sampling is applied to conduct Bayesian inference. There are two versions for Bayesian inference, an offline approach and an online approach.

The Gibbs sampling algorithm handles both inference approaches with a few minor changes as discussed in more details below. In 204, the process repeats 203 until the number of required iterations is reached. In 205, the process returns the community membership assignments, $Z_T = \{Z^{(1)}, \ldots, Z^{(T)}\}$, for all individuals over all time steps as the output of this procedure.

Figure 3:
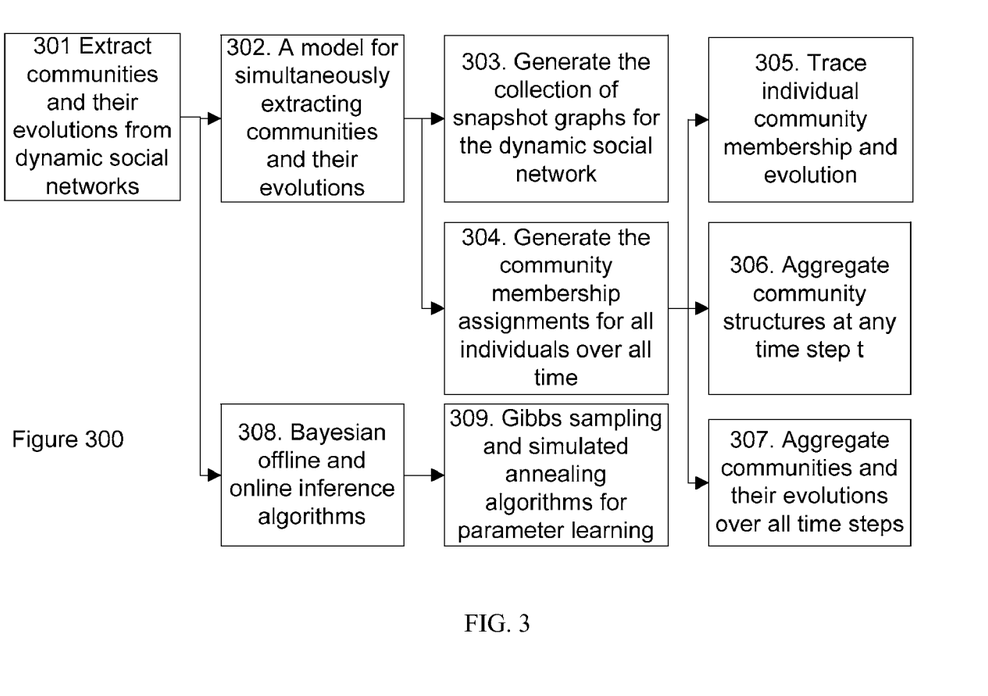
FIG. 3 shows an exemplary process or method for extracting communities and their evolutions from dynamic social networks.

FIG. 3 shows an exemplary process or method for extracting communities and their evolutions from dynamic social networks (301). The process includes a model to simultaneously extract communities and their evolutions (302), and the corresponding Bayesian offline and online inference learning algorithms (308).

The operation of the model 302 is discussed next. In 303, the process generates a collection of snapshot graphs for the dynamic social network. In 304, the process generates the community membership assignments for all individuals in the social network over all time steps. From the membership assignment operation, the process continues with three possible operations. In 305, the process applies the community assignments for an individual to track his or her community membership evolution over time. Alternatively, in 306, the process applies the community assignments for all individuals at a given time step t to obtain the aggregated community structure at time t. In 307, the process can apply the community assignments for all individuals at all time steps to obtain the communities and their evolutions.

From 308, the process can use either the offline or the online Bayesian inference algorithm. In 309, Gibbs sampling or simulated annealing can be used to learn model parameters.

The details of the processes of FIGS. 1-3 will be discussed next. For a social network, a matrix $W^{(t)} \in R^{n \times n}$ represents the snapshot of a social network at a given time step t (or snapshot network), where n is the number of nodes in the network. Each element $w_{ij}$ in $W^{(t)}$ is the weight assigned to the link between nodes i and j: it can be the frequency of interactions (i.e., a natural number) or a binary number indicating the presence or absence of interactions between nodes i and j. For a dynamic social network, $W_T = \{W^{(1)}, W^{(2)}, \ldots, W^{(T)}\}$ denotes a collection of snapshot graphs for a given social network over T discrete time steps. The system assumes nodes in the social network remain unchanged during all the time steps, followed by the extension to dynamic social networks where nodes can be removed from and added to networks.

Let $z_i \in \{1, \ldots, K\}$, where K is the total number of communities, denotes the community assignment of node i and $z_j$ is the community of node i. Further, let $z_{ik} = [z_i = k]$ indicate if node i is in the k th community where [x] output one if x is true and zero otherwise. Community assignments matrix $Z = (z_{ik}: i \in \{1, \ldots, n\}, k \in \{1, \ldots, K\})$ includes the community assignments of all the nodes in a social network at a given time step. Finally, $Z_T = \{Z^{(1)}, \ldots, Z^{(T)}\}$ denotes the collection of community assignments of all nodes over T time steps.

Figure 4A:
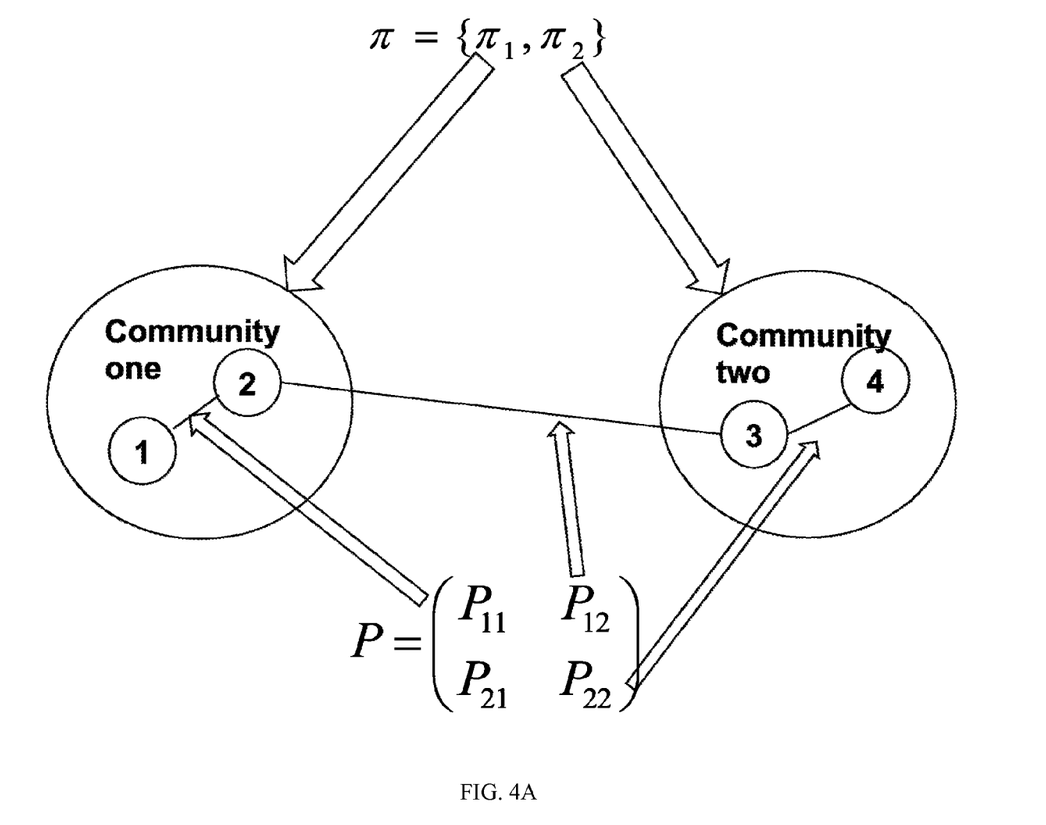
FIG. 4A-4B show a statistical model called Stochastic Block Model (SBM) used in social network analysis.
Figure 4B:
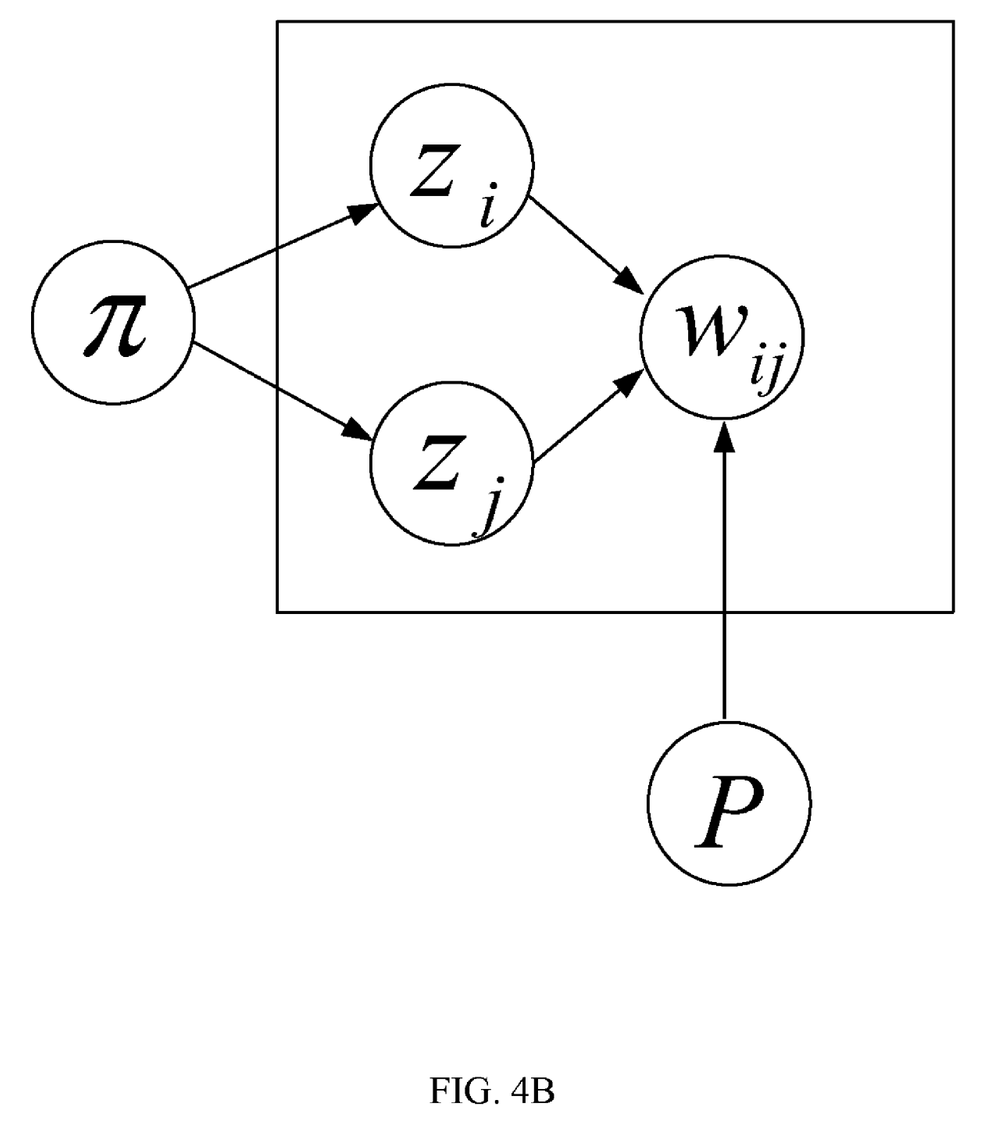

FIGS. 4A-4B show a statistical model called Stochastic Block Model (SBM) used in social network analysis. In the SBM model, a network is generated in the following way. First, each node is assigned to a community following a probability $\pi = \{\pi_1, \ldots, \pi_K\}$ where $\pi_k$ is the probability for a node to be assigned to community k. Then, depending on the community assignments of nodes i and j (assuming that $z_{ik}=1$ and $z_{jl}=1$), the link between i and j is generated following a Bernoulli distribution with parameter $P_{kl}$. The parameters of SBM are $\pi \in R^K$ and $P \in R^{K \times K}$. The diagonal element $P_{kk}$ of P is called the "within-community" link probability for community k and the off-diagonal element $P_{kl}$, $k \neq l$ is called "between-community" link probability between communities k and l.

Figure 5A:
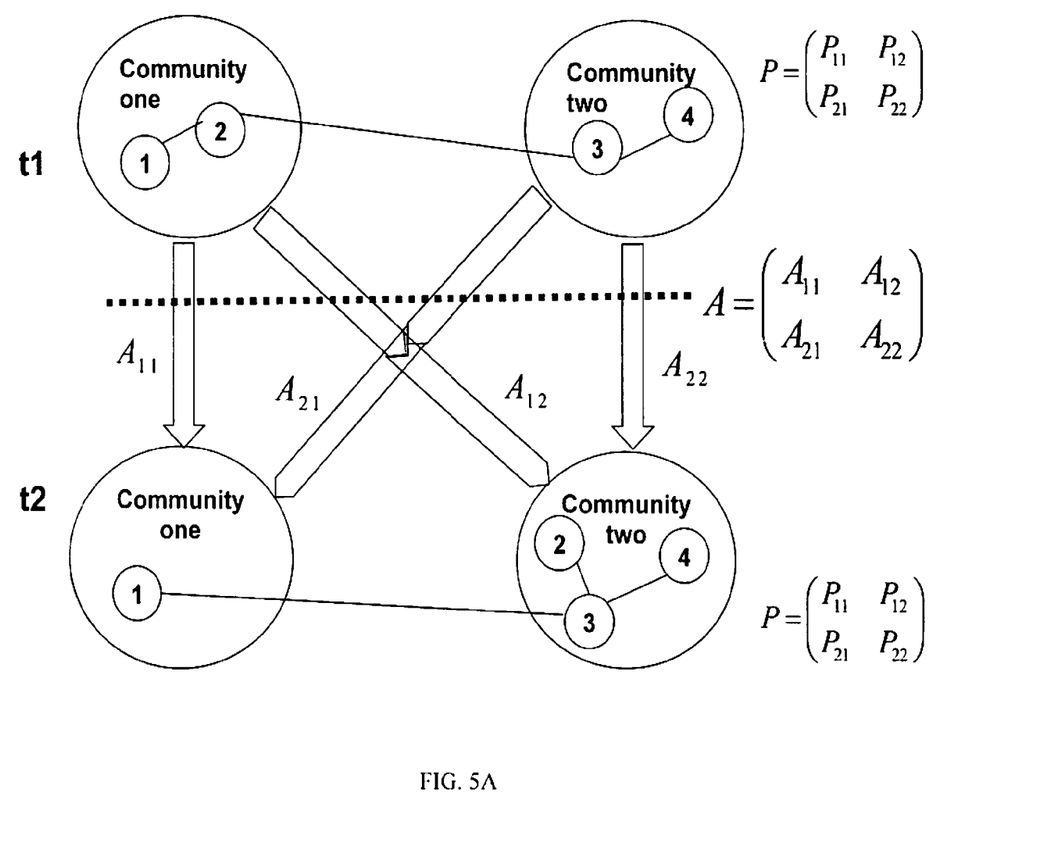
FIGS. 5A-5B show a Dynamic Stochastic Block Model (DSBM) that extends SBM to dynamic social networks.
Figure 5B:
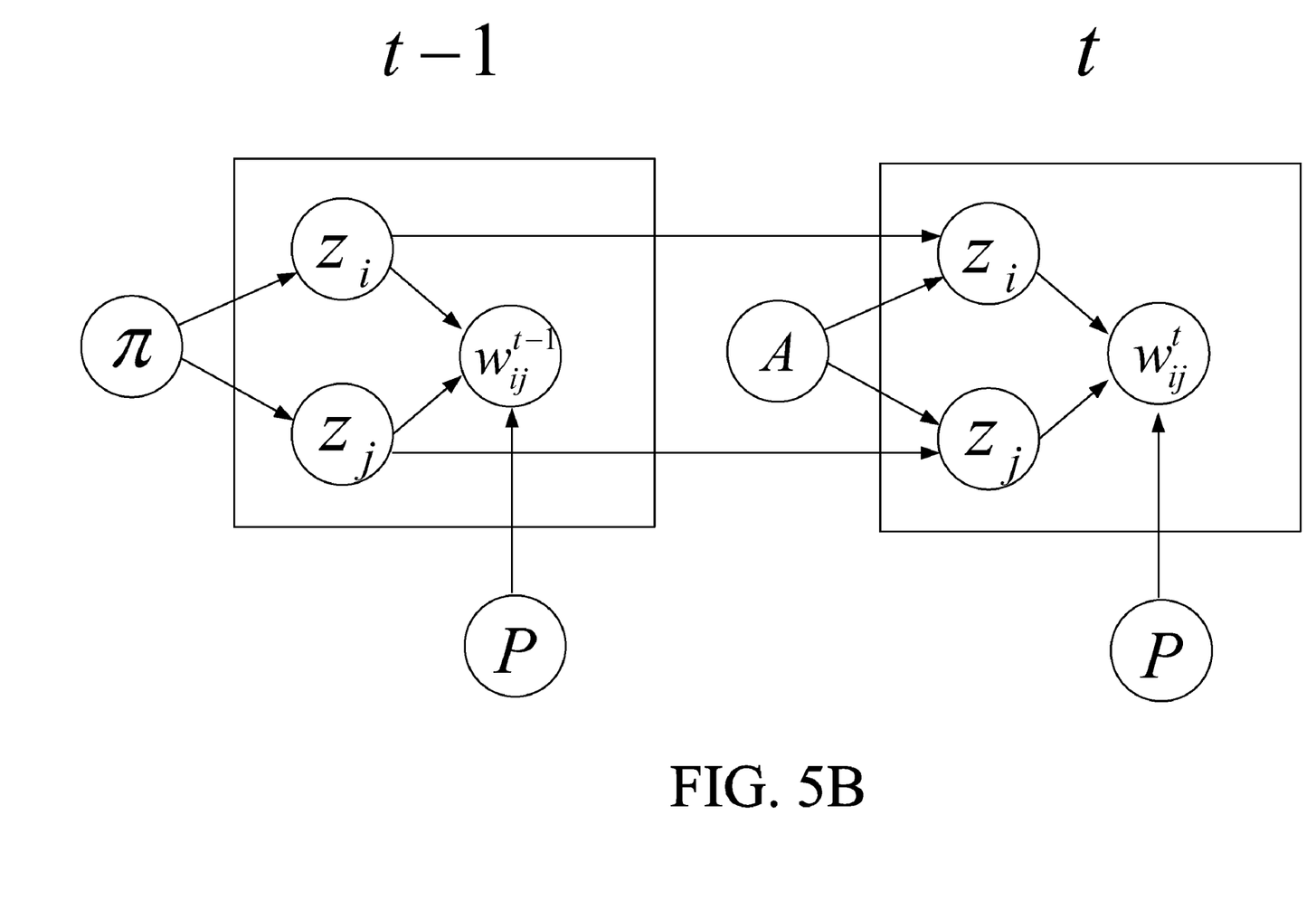

FIGS. 5A-5B show a Dynamic Stochastic Block Model (DSBM) that extends SBM to dynamic social networks. It is defined in a recursive way. Assuming the community matrix $Z^{(t-1)}$ for time step t-1 is available, the system uses a transition matrix $A \in R^{K \times K}$ to model the community matrix $Z^{(t)}$ at time step t in the following way. For a node i, if $z_{ik}^{(t-1)}=1$, i.e., node i was assigned to community k at time t-1, then with probability $A_{kk}$ node i will remain in community k at time step t and with probability $A_{kl}$ node i will change to another community l where $k \neq l$. The system has each row of A sums to 1, i.e., $\Sigma_l A_{kl}=1$. Given the community memberships in $Z^{(t)}$, the link between nodes will be then decided stochastically by probabilities in P as the SBM model. The generative process of the Dynamic Stochastic Block Model and the graphical representation are shown in FIG. 5B. Note that DSBM and SBM differ in how the community assignments are determined. In the DSBM model, instead of following a prior distribution $\pi$, the community assignments at any time t (t>1)

are determined by those at time t−1 through transition matrix A, where A aims to capture the dynamic evolutions of communities.

To express the data likelihood for the proposed DSBM model, two assumptions about the data generation process can be made. First, link weight $w_{ij}$ is generated independent of the other nodes/links provided membership $z_i$ and $z_j$. Second, the community assignment $z_i^{(t)}$ of node i at time step t is independent of the other nodes/links provided its community assignment $z_i^{(t-1)}$ at time t−1. Using these assumptions, the likelihood of the complete data for the DSBM model is as follows $$Pr(W_T, Z_T | \pi, P, A) = \prod_{t=1}^{T} Pr(W^{(t)} | Z^{(t)}, P) \prod_{t=2}^{T} Pr(Z^{(t)} | Z^{(t-1)}, A) Pr(Z^{(1)} | \pi)$$

where the emission probability $Pr(W^{(t)}|Z^{(t)}, P)$ and the transition probability $Pr(Z^{(t)}|Z^{(t-1)}, A)$ are $$Pr(W^{(t)} | Z^{(t)}, P) = \prod_{i:j} Pr(w_{ij}^{(t)} | z_i^{(t)}, z_j^{(t)}, P)$$

$$= \prod_{i:j} \prod_{k,l} \left( P_{kl}^{w_{ij}^{(t)}} (1 - P_{kl})^{1-w_{ij}^{(t)}} \right)^{z_{ik}^{(t)} z_{jl}^{(t)}}$$

and $$Pr(Z^{(t)} | Z^{(t-1)}, A) = \prod_{i=1}^{n} Pr(Z_i^{(t)} | Z_i^{(t-1)}, A)$$

$$= \prod_{i=1}^{n} \prod_{k,l} A_{kl}^{z_{ik}^{(t-1)} z_{il}^{(t)}},$$

respectively. Note that in this model, self-loops are not considered and so in the above equations, i: j means over all i's and j's such that $i \neq j$. Finally, term $Pr(Z^{(1)}|\pi)$ is the probability of community assignments at the first time step and is expressed as $$Pr(Z^{(1)} | \pi) = \prod_{i=1}^{n} \prod_{k} \pi_k^{z_{ik}^{(1)}}.$$

In order to predict memberships of nodes in a given dynamic social network, one approach is to first estimate the most likely values for parameters π, P, and A from the historical data, and then infer the community memberships in the future using the estimated parameters. This is usually called point estimation in statistics, and can have instability when data is noisy. Instead of using the most likely values for the model parameters, the system utilizes the distribution of model parameters when computing the prediction.

The prior distributions for model parameters π, P, and A is discussed next. The conjugate prior for π is the Dirichlet distribution $$Pr(\pi) = \frac{\Gamma\left(\sum_k \gamma_k\right)}{\prod_k \Gamma(\gamma_k)} \prod_k \pi_k^{\gamma_k - 1} \quad (1)$$

where $\Gamma(\cdot)$ is the Gamma function. The P matrix is assumed to be symmetric to reduce the number of parameters to $$\frac{n(n+1)}{2}.$$

The conjugate prior for each parameter $P_{kl}$ for $l \geq k$ is a Beta distribution, and therefore the prior distribution for P is $$Pr(P) = \prod_{k, l \geq k} \frac{\Gamma(\alpha_{kl} + \beta_{kl})}{\Gamma(\alpha_{kl})\Gamma(\beta_{kl})} P_{kl}^{\alpha_{kl}-1}(1 - P_{kl})^{\beta_{kl}-1}. \quad (2)$$

Finally, the conjugate prior for each row A is a Dirichlet distribution and the prior distribution for A is $$Pr(A) = \prod_k \frac{\Gamma\left(\sum_l \mu_{kl}\right)}{\prod_l \Gamma(\mu_{kl})} \prod_l A_{kl}^{\mu_{kl}-1}. \quad (3)$$

To make the discussion concise, the following notations are used.

$$n_k^{(t)} = \sum_i z_{ik}^{(t)} \quad (4)$$

$$n_{k \to l}^{(t_1:t_2)} = \sum_{t=t_1+1}^{t_2} \sum_{i=1}^{n} z_{ik}^{(t-1)} z_{il}^{(t)} \quad (5)$$

$$n_{k \to \cdot}^{(t_1:t_2)} = \sum_{t=t_1+1}^{t_2} \sum_{i=1}^{n} z_{ik}^{(t-1)} \quad (6)$$

$$n_{kl}^{(t_1:t_2)} = \sum_{t=t_1}^{t_2} \sum_{i:j} (z_{ik}^{(t)} z_{jl}^{(t)} + z_{il}^{(t)} z_{jk}^{(t)}) \quad (7)$$

$$\hat{n}_{kl}^{(t_1:t_2)} = \sum_{t=t_1}^{t_2} \sum_{i:j} w_{ij}^{(t)} (z_{ik}^{(t)} z_{jl}^{(t)} + z_{il}^{(t)} z_{jk}^{(t)}) \quad (8)$$

Using these notations, and with the prior distributions of the model parameters, the closed form expression for the joint probability of the complete data that is marginalized over the distribution of model parameters is discussed next.

With the priors of parameters $\theta = \{\pi, P, A\}$ defined in Equations (1): (3) together with the notations given in Equations (4): (8), the joint probability of observed links and unobserved community assignments is proportional to $$Pr(W_T, Z_T) = \int Pr(W_T, Z_T \mid \theta) Pr(\theta) d\theta \propto \prod_k \Gamma(n_k^{(1)} + \gamma_k)$$

-continued $$\prod_k \frac{\prod_l \Gamma\left(n_{k \to l}^{(1:T)} + \mu_{kl}\right)}{\Gamma\left(n_{k \to \cdot}^{(1:T)} + \sum_l \mu_{kl}\right)} \times \prod_{k, l > k} B\left(\hat{n}_{kl}^{(1:T)} + \alpha_{kl}, n_{kl}^{(1:T)} - \hat{n}_{kl}^{(1:T)} + \beta_{kl}\right) \times$$

$$\prod_k B\left(\frac{\hat{n}_{kk}^{(1:T)}}{2} + \alpha_{kk}, \frac{n_{kk}^{(1:T)} - \hat{n}_{kk}^{(1:T)}}{2} + \beta_{kk}\right)$$

where $B(\cdot)$ is the Beta function.

In this Bayesian inference framework, to obtain the community assignment of each node at each time step, the system computes the posterior probability $Pr(Z_T|W_T)$. This is in general an intractable problem. In the next two subsections, the system introduces two versions of the inference method, i.e., an offline learning approach and an online learning approach.

Offline Learning

In offline learning, it is assumed that the link data of all time steps are accessible and therefore, the community assignments of all nodes in all time steps can be decided simultaneously by maximizing the posterior probability, i.e., $$Z_T^* = \underset{Z_T}{\operatorname{argmax}} Pr(Z_T \mid W_T) = \underset{Z_T}{\operatorname{argmax}} Pr(W_T, Z_T) \quad (9)$$

where $Pr(W_T, Z_T)$ is given in above. In offline learning, the community membership of each node at every time step t is decided by the link data of all time steps, even the link data of time steps later than t. Given this observation, offline learning can deliver more reliable estimation of community memberships than the online learning that is discussed next.

Online Learning

In online learning, community memberships are learned incrementally over time. Assume the community membership is $Z^{(t-1)}$ at time step t-1, and observed links $W^{(t)}$ at time t, the system can decide the community assignments at time t by maximizing the posterior probability of community assignments at time t given $Z^{(t-1)}$ and $W^{(t)}$, i.e., $$Z^{*(t)} = \underset{Z^{(t)}}{\operatorname{argmax}} Pr(Z^{(t)} \mid W^{(t)}, Z^{(t-1)})$$

Hence, to decide $Z^{(t)}$, the key is to efficiently compute $Pr(Z^{(t)}|W^{(t)}, Z^{(t-1)})$ except for time step 1 in which the system needs to compute $Pr(Z^{(t)}|W^{(1)})$.

Next, closed form solutions for the two probabilities are discussed. Both probabilities are computed by averaging over the distribution of the model parameters.

With the priors of parameters $\theta = \{\pi, P, A\}$ given in Equations (1): (3), the posterior probability of unobserved community assignments given the observed links and the community assignments at previous time step is proportional to $$Pr(Z_1 \mid W_1) \propto \prod_k \Gamma(n_k^{(1)} + \gamma_k) \times \prod_{k, l > k} B(\hat{n}_{kl}^{(1)} + \alpha_{kl}, n_{kl}^{(1)} - \hat{n}_{kl}^{(1)} + \beta_{kl}) \times \quad (10)$$

$$\prod_k B\left(\frac{\hat{n}_{kk}^{(1)}}{2} + \alpha_{kk}, \frac{n_{kk}^{(1)} - \hat{n}_{kk}^{(1)}}{2} + \beta_{kk}\right) Pr(Z^{(t)} \mid W^{(t)}, Z^{(t-1)}) \propto$$

-continued $$\prod_k \left( \prod_l \frac{\Gamma\left(n_{k \to l}^{(t-1:t)} + \mu_{kl}\right)}{\Gamma\left(n_{k \to \cdot}^{(t-1:t)} + \sum_l \mu_{kl}\right)} \right) \times \prod_{k,l>k} B(\hat{n}_{kl}^{(t)} + \alpha_{kl},$$

$$n_{kl}^{(t)} - \hat{n}_{kl}^{(t)} + \beta_{kl}) \times \prod_k B\left(\frac{\hat{n}_{kk}^{(t)}}{2} + \alpha_{kk}, \frac{n_{kk}^{(t)} - \hat{n}_{kk}^{(t)}}{2} + \beta_{kk}\right).$$

In online learning, it is assumed that data arrives sequentially and historic community assignments are not updated upon the arrival of new data. Therefore, the online learning algorithm can be implemented more efficiently than the offline learning algorithm.

Inference Algorithm

To optimize the posterior probabilities in the offline and online learning algorithms introduced in the previous section, the system uses Gibbs sampling method. In Gibbs sampling, the system computes the conditional probability of the community assignment of each node conditioned on the community assignments of other nodes.

For offline learning, the system computes the conditional probability $Pr(z_i^{(t)}|Z_{T,\{i,t\}}, W_T)$, via $Pr(Z_T|W_T)$, where $Z_{T,\{i,t\}}$ are the community assignments of all nodes at all time steps except node i at time step t. This can be computed by marginalizing $z_i^{(t)}$ in Equation (9). Similarly, for online learning, the system can compute the conditional probability $Pr(z_i^{(t)}|Z_{i^-}^{(t)}, W^{(t)}Z^{(t-1)})$, where $Z_{i^-}^{(t)}$ is the collection of community assignments of all nodes, except node i, at time step t. This can be computed by marginalizing $Pr(Z^{(t)}|W^{(t)}, Z^{(t-1)})$. The following algorithms describe a simulated annealing version of the inference algorithm. Probabilistic Simulated Annealing Algorithm 1. Randomly initialize the community assignment for each node at time step t (online learning) or at all time steps (offline learning); select the temperature sequence $\{T_1, \ldots, T_M\}$ and the iteration number sequence $\{N_1, \ldots, N_M\}$.

2. for each iteration $m=1, \ldots, M$, run $N_m$ iterations of Gibbs sampling with target distributions $\exp\{\log Pr(Z^{(t)}|W^{(t)}, Z^{(t-1)})/T_m\}$ or $\exp\{\log Pr(Z_T|W_T)/T_M\}$.

Gibbs Sampling Algorithm

1. Compute the following statistics with the initial assignments:

$n_k^{(t)}$ $n_{kl}^{(1:T)}, \hat{n}_{kl}^{(1:T)}$ or $n_{kl}^{(t)}, \hat{n}_{kl}^{(t)}$ $n_{k \to l}^{(1:T)}, n_{k \to \cdot}^{(1:T)}$ or $n_{k \to l}^{(t-1:t)}, n_{k \to \cdot}^{(t-1:t)}$ 2. for each iteration $m_t=1:N_m$, and for each node $i=1:n$ at each time t Compute the objective function in Simulated Annealing $\exp\{\log Pr(z_i^t|Z_{i^-}^{(t)}, W^{(t)}, Z^{(t-1)})/T_m\}$ or $\exp\{\log Pr(z_i^t|Z_{T,\{i,t\}}, W_T)/T_m\}$ up to a constant using the current statistics, and then obtain the normalized distribution.

Sample the community assignment for node i according to the distribution obtained above, update it to the new one.
Update the statistics.

Several techniques can be used to improve the efficiency of the algorithm. First, since in each step of the sampling, only one node i at a given time t changes its community assignment, almost all the statistics can be updated incrementally to avoid recomputing. Second, the algorithm is designed to take advantage of the sparseness of the matrix $W^{(t)}$. For instance, the system exploits the sparseness of $W^{(t)}$ to facilitate the computation of $\hat{n}_{kl}^{(t_1:t_2)}$.

The time complexity of the implementation of the Gibbs sampling algorithm is $O(nT+eT+K^2T+NT(eC_1+nC_2))$ where e is the total number of edges in the social network over all the time steps, N is the number of iterations in Gibbs sampling, $C_1$ and $C_2$ are constants.

As can be seen, when the social network is sparse and when the degree of each node is bounded by a constant, the running time of each iteration of the Gibbs sampling algorithm is linear in the size of the social network.

Two extensions can be made to the basic framework, including how to handle different types of links and how to handle insertion and deletion of nodes in the network. In addition, the selection of the hyperparameters in the model is discussed next.

So far, the system has used binary links, where the binary links (i.e., either $w_{ij}=1$ or $w_{ij}=0$) indicate the presence or absence of a relation between a pair of nodes. However, there exist other types of links in social networks as well. Here the model can be expanded to handle two other cases: when $w_{ij} \in N$ and when $w_{ij} \in R^+$. If $w_{ij}$ indicates the frequency of interactions (e.g., the occurrence of interactions between two bloggers during a day, the number of papers that two authors co-authored during a year, etc.), then $w_{ij}$ can be any non-negative integer. The current model actually can handle this case with little change: the emission probability $$Pr(w_{ij} \mid z_i, z_j) = \prod_{k,l} \left(P_{kl}^{w_{ij}}(1 - P_{kl})\right)^{z_{ik} z_{jl}} \quad (11)$$

remains valid for $w_{ij} \in N$, except that instead of a Bernoulli distribution (i.e., $w_{ij}=0$ or 1), now $w_{ij}$ follows a geometric distribution. Note that the $(1-P_{kl})$ term is needed to take into account the case where there is no edge between i and j.

In other applications, $w_{ij}$ represents the similarity or distance between nodes i and j and therefore $w_{ij} \in R^+$, the set of non-negative real numbers. In such a case, the system can first discretize the $w_{ij}$ by using finite bins and then introduce the emission probabilities as before. Another way to handle the case when $w_{ij} \in R^+$ is to introduce a k-nearest neighbor graph and therefore reduce the problem to the case when $w_{ij}=0$ or 1.

In dynamic social networks, at a given time, new individuals may join in the network and old ones may leave. To handle insertion of new nodes and deletion of old ones, existing algorithm use heuristics, e.g., by assuming that all the nodes are in the network all the time but in some time steps certain nodes have no incident links. In comparison, in both the online and the offline versions of the algorithm, no such heuristics are necessary. For example, for online learning, let $S_t$ denote the set of nodes at time t, $I_t = S_t \cap S_{t-1}$ be set of nodes appearing in both time steps t and t-1. $U_t = S_t - S_{t-1}$ be the new nodes at time t. Then the system can naturally model the posterior probability of the community assignments at time t as $$Pr(Z^{(t)}|W^{(t)}, Z^{(t-1)}) \propto Pr(Z^{(t)}, W^{(t)}|Z^{(t-1)}) = Pr(W^{(t)}|Z^{(t)})Pr \\ (Z_{I_t}^{(t)}|Z_{I_t}^{(t-1)})Pr(Z_{U_t}^{(t)}) \quad (12)$$

and the system can directly write the part corresponding to Equation (10) as $$Pr(Z^{(t)} \mid W^{(t)}, Z^{(t-1)}) \propto$$

$$\prod_k \Gamma(n_{k,U_t}^{(t)} + \gamma_k) \times \prod_k \left( \prod_l \frac{\Gamma\left(n_{k \to l, I_t}^{(t-1:t)} + \mu_{kl}\right)}{\Gamma\left(n_{k \to \cdot, I_t}^{(t-1:t)} + \sum_l \mu_{kl}\right)} \right) \times$$

$$\prod_{k,l>k} B(\hat{n}_{kl,S_t}^{(t)} + \alpha_{kl}, n_{kl,S_t}^{(t)} - \hat{n}_{kl,S_t}^{(t)} + \beta_{kl}) \times$$

$$\prod_k B\left( \frac{\hat{n}_{kk,S_t}^{(t)}}{2} + \alpha_{kk}, \frac{n_{kk,S_t}^{(t)} - \hat{n}_{kk,S_t}^{(t)}}{2} + \beta_{kk} \right)$$

where $n_{*,S}^*$ is the corresponding statistics evaluated on the nodes set of S. Similar results can be derived for the offline learning algorithm. In brief, the model can handle the insertion and deletion of nodes without using any heuristics.

Next, the roles of the hyperparameters ($\gamma$, $\alpha$, $\beta$, and $\mu$) are discussed along with guidelines on how to choose the values for these hyperparameters. In the experimental studies section below, the impact of the values of these hyperparameters on the performance of the algorithm will be discussed.

$\gamma$ is the hyperparameter for the prior of $\pi$. The system can interpret the $\gamma_k$ as an effective number of observations of $z_{ik}=1$. Without other prior knowledge the system sets all $\gamma_k$ to be the same. $\alpha$, $\beta$ are the hyperparameters for the prior of P. As stated before, the system discriminates two probabilities in P, i.e., $P_{kk}$ the "within-community" link probability, and $P_{kl,l \neq k}$ the "between-community" link probability. For the hyperparameters, the system sets two groups of values, i.e., (1) $\alpha_{kk}$, $\beta_{kk}$, $\forall_k$ and (2) $\alpha_{kl,l \neq k}$, $\beta_{kl,l \neq k}$. Because the system has the prior knowledge that nodes in the same community have higher probability to link to each other than nodes in different communities, the system sets $\alpha_{kk} \geq \alpha_{kl,l \neq k}$, $\beta_{kk} \leq \beta_{kl,l \neq k}$. $\mu$ is the hyperparameter for A. $A_{k*}=\{A_{k1}, \ldots, A_{kk}, \ldots, A_{kK}\}$ are the transition probabilities for nodes to switch from the k th community to other (including coming back to the k th) communities in the following time step. $\mu_{k*}=\{\mu_{k1}, \ldots, \mu_{kk}, \ldots, \mu_{kK}\}$ can be interpreted as effective number of nodes in the k th community switching to other (including coming back to the k th) communities in the following time step. With prior belief that most nodes will not change their community memberships over time, the system sets $\mu_{kk} \geq \eta_{kl,l \neq k}$.

The selection of the exact values for the hyperparameters $\gamma$, $\alpha$, $\beta$, and $\mu$ is described in the empirical studies below.

Experiments

Several experimental studies have been done. First, the performance of the algorithms is not sensitive to most hyperparameters in the Bayesian inference and for the only hyperparameters that impact the performance significantly, a principled method can be used for automatic parameter selection. Second, the Gibbs-sampling-based algorithms have very fast convergence rate, which makes the instant algorithms very practical for real applications. The algorithms clearly outperform several state-of-the-art algorithms in terms of discovering the true community memberships and capturing the true evolutions of community memberships. Finally, algorithms are able to reveal interesting insights that are not directly obtainable from other algorithms.

The experiments can be categorized into two types, those with ground truth available and those without ground truth. Ground truth is defined as the true community membership of each node at each time step. When the ground truth is available, the system measures the performance of an algorithm by the normalized mutual information between the true community memberships and those given by the algorithm. More specifically, if the true community memberships are represented by $C=\{C_1, \ldots, C_K\}$ and those given by the algorithm are represented by $C'=\{C'_1, \ldots, C'_K\}$, then the mutual information between the two is defined as $$\hat{MI}(C, C') = \sum_{C_i, C'_j} p(C_i, C'_j) \log \frac{p(C_i, C'_j)}{p(C_i)p(C'_j)}$$

and the normalized mutual information is defined by $$MI(C, C') = \frac{\hat{MI}(C, C')}{\max(H(C), H(C'))}$$

where H(C) and H(C') are the entropies of the partitions C and C'. The value of MI is between 0 and 1 and a higher MI value indicates that the result given by the algorithm C' is closer to the ground truth C. This metric MI has been commonly used in the information retrieval field.

Where there is no ground truth available in the dataset, performance can be measured by using the metric of modularity for measuring community partitions. For a given community partition $C=\{C_1, \ldots, C_K\}$, the modularity is defined as $$Modu(C) = \sum_k \left[ \frac{Cut(V_k, V_k)}{Cut(V, V)} - \left( \frac{Cut(V_k, V)}{Cut(V, V)} \right)^2 \right]$$

where V represents all the nodes in the social network and $V_k$ indicates the set of nodes in the kth community $C_k$. $Cut(V_i, V_j) = \Sigma_{p \in V_i, q \in V_j} w_{pq}$. As state in, modularity measures how likely a network is generated due to the proposed community structure versus generated by a random process. Therefore, a higher modularity value indicates a community structure that better explains the observed social network.

The system generates synthetic test data by following a procedure suggested by Newman et al. The data consists of 128 nodes that belong to 4 communities with 32 nodes in each community. Links are generated in the following way. For each pair of nodes that belong to the same community, the probability that a link exists between them is $p_{in}$; the probability that a link exists between a pair of nodes belonging to different communities is $p_{out}$. However, by fixing the average degree of nodes in the network, which the system set to be 16 in the datasets, only one of $p_{in}$ and $p_{out}$ can change freely. By increasing $p_{out}$, the network becomes more noisy in the sense that the community structure becomes less obvious and hard to detect. The system generate datasets under three different noise levels by setting $p_{in}=0.1452$ ($p_{out}=0.0365$), $p_{in}=0.1290$ ($p_{out}=0.0417$), and $p_{in}=0.1129$ ($p_{out}=0.0469$), respectively. The ratio of $p_{out}/p_{in}$ increases from 0.2512 for level one to 0.3229 for level two and 0.4152 for level three.

The above network generator described by Newman et al. can only generate static networks. To study dynamic evolution, the system let the community structure of the network evolve in the following way. The system start with introducing evolutions to the community memberships: at each time step after time step 1, the system randomly choose 10% of the nodes to leave their original community and join the other three communities at random. After the community memberships are decided, links are generated by following the probabilities $p_{in}$ and $p_{out}$ as before. The system generate the network with community evolution in this way for 10 time steps.

Hyperparameters

In the first experiment, the impact of the hyperparameters on the performance of the algorithm were analyzed. The process was tested under a large range of values for the hyperparameters γ (for the initial probability π) and μ (for the transition matrix A), respectively. The performance varies little under different values for γ and μ, which verifies that the algorithm is robust to the setting of these hyperparameters. These experiments show that the performance is not sensitive to γ and μ. However, the performance of the algorithm is somewhat sensitive to the hyperparameters α and β for P, which is the stochastic matrix representing the community structure at each time step. The performance varies under different α and β values. This result makes sense because α and β are crucial for the stochastic model to correctly capture the community structure of the network. For example, the best performance is achieved when α is in the same range as the total number of links in the network. In addition, a clear correlation exists between the accuracy with respect to the ground truth, which is not seen by the algorithm, and the modularity, which is available to the algorithm. As a result, modularity value can be used as a validation metric to automatically choose good values for α and β. All the experimental results reported in the following are obtained from this automatic validation procedure.

In another experiment, the performance of the online and offline versions of the DSBM algorithm was compared with those of two recently proposed algorithms for analyzing dynamic communities—the dynamic graph-factorization clustering algorithm (FacetNet) by Lin et al. and the evolutionary spectral clustering algorithm (EvolSpect) by Chi et al. . In addition, the system also provide the performances of the static versions for all the algorithms—static stochastic block models (SSBM) for DSBM, static graph-factorization clustering (SGFC) for FacetNet, and static spectral clustering (SSpect) for EvolSpect.

First, the DSBM algorithms have the best accuracy and outperform all other baseline algorithms at every time step for all the three datasets. Second, the offline version of the algorithm, which takes into consideration all the available data simultaneously, has better performance than that of the online version. Third, the evolutionary versions of all the algorithms outperform their static counterparts in most cases, which demonstrates the advantages of the dynamic models in capturing community evolutions in dynamic social networks.

Next, an experiment was conducted to see which algorithms can capture the community evolution more faithfully. The DSBM algorithms have the best precision and the best recall values for all the three datasets, which illustrates that the algorithms can capture the true community evolution more faithfully than the baseline algorithms.

The system used Gibbs sampling for Bayesian inference. One experiment shows that this Gibbs sampling procedure converges very quickly. The first time step requires more iterations but even for the first time step, fewer than 20 iterations are enough for the algorithm to converge. For the time steps 2 to 10, by using the results at the previous time step as the initial values, the algorithm converges in just a couple of iterations. This result, together with the time complexity analysis, demonstrates that the algorithm is practical and is scalable to large social networks in real applications.

Next, the system present experimental studies on three real datasets: a traditional social network dataset, a blog dataset, and a paper co-authorship dataset. The southern women data is a standard benchmark data in social science. It was collected in 1930's in Natchez, Miss. The data records the attendance of 18 women in 14 social events during a period of one year. The system obtain the social network by assigning $w_{ij}$ for women i and j the number of times that they co-participated in the same events. The system first apply the static stochastic model (SBM) to the aggregated data and the system set the number of communities to be 2, the number used in most previous studies. Not surprisingly, the system obtain the same result as most social science methods reported in, that is, women 1-9 belong to one community and women 10-18 belong to the other community.

Next, based on the number of events that occurred, the system partition the time period into 3 time steps: (1) February-March, when women 1-7,9,10, and 13-18, participated social events 2,5,7, and 11; (2) April-May, when women 8,11,12, and 16 joined in and together they participated in events 3,6,9, and 12; (3) June-November, when events 1,4,8, 10, and 13 happened for which women 17 and 18 did not show up. The system apply both the offline and the online versions of the algorithm on this dataset with 3 time steps. It turns out that the offline algorithm reports no community change for any woman. This result suggests that if the system take the overall data into consideration simultaneously, the evidence is not strong enough to justify any change of community membership. However, in the online learning algorithm, if the system decrease the hyperparameter $\mu_{kk}$ for A to a very small value (around 1) and therefore encourage changes of community memberships, women 6-9 start to change their community at time step 3. The system determines that this change is due to the social event 8, which is the only event that women 6-9 participated at time step 3 and is mainly participated by women who were not in the same community as women 6-9 at time steps 1 and 2.

The system was tested against a blog dataset was collected by NEC Labs and have been used in several previous studies on dynamic social networks. It contains 148,681 entry-to-entry links among 407 blogs during 15 months. In this study, the system first partition the data in the following way. The first 7 months are used for the first 7 time steps; data in months 8 and 9 are aggregated into the 8th time step; data in months 10-15 are aggregated into the 9th time step. The reason for this partition is that in the original dataset, the number of links dropped dramatically toward the end of the time and the partition above makes the number of links at each time step to be evenly around 200.

The system was tested against the two baselines, the dynamic graph-factorization clustering (FacetNet) and the evolutionary spectral clustering (EvolSpect). The number of communities was 2 (which roughly correspond to a technology community and a political community). In terms of hyperparameters for the algorithm, for γ and μ, the system simply selected default values (i.e., $\gamma_k=1$, $\mu_{ki}=1$, and $\mu_{kk}=10$), and for α and β, the system chose the ones that result in the best modularity. For the two baseline algorithms, their parameters are chosen to obtain the best modularity. Based on the result, the offline and online versions of the algorithm give similar results and they both outperform the baseline algorithms.

Actually, the system found that most blogs are stable in terms of their communities. However, there are still some blogs changing their communities detected by the algorithms based on the links information. Here, the system present the community memberships of the representative blogs. Three of them (blogs 94, 192, and 357) have the most number of links across the whole time and one of them (blog 230) has the least number of links, only at two time steps. To help the visualization, the system assign one of the two labels to each blog where the labels are obtained by applying the normalized cut algorithm on the aggregated blog graph. Therefore, these labels give us the community membership of each blog if the system use static analysis on the aggregated data. Then to visualize the dynamic community memberships, for a blog at a given time step, the system show the fractions of the blog's neighbors (through links) that have each of the two possible labels at the given time step.

Another experiment uses paper co-authorship data. This data has been studied in and it contains the co-authorship information among the papers in 28 conferences over 10 years (1997-2006). The 28 conferences span three main areas—data mining (DM), database (DB), and artificial intelligence (AI). The system applies the algorithm to this dataset with the known community number 3. By checking the conference venues of the papers published by authors each year and by checking the biographies of these authors, the system verified that the above changes all correspond to switches of research focus that really happened. The conference venues (and therefore the class labels for all the conferences and all the papers) were not used in the algorithms. This implies that by only study the interactions among individuals (the co-authorship), the algorithms can discover meaningful changes of community memberships that are related to real-world events.

The framework based on Bayesian inference succeeded in finding communities and captured community evolutions in dynamic social networks. The framework is a probabilistic generative model that unifies the communities and their evolutions in an intuitive and rigorous way; the Bayesian treatment gives robust prediction of community memberships. The processes are efficient and practical in real applications. Experimental studies showed that the instant methods and processes outperform several state-of-the-art baseline algorithms in different measures and reveal useful insights in several real social networks. The system uses a dynamic stochastic block model for modeling communities and their evolutions in a unified framework. As a result, from a dynamic social network, the system can the extract more accurately communities, more faithful community evolutions, and more insights that are not available through other methods.

The current Bayesian framework relies solely on the links to infer the community memberships of nodes in social networks. However, the framework can incorporate information other than links such as the contents of blogs.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to find dynamic social networks, comprising:
   a. applying a computer to a dynamic stochastic block model to generate one or more dynamic social networks, wherein the model simultaneously captures communities and their evolutions,
   b. determining Gibbs sampling as a conditional probability of a community assignment of each node conditioned on the community assignments of other nodes as $\Pr(z_i^{(t)}|Z_{T,\{i,t\}^-}, W_T)$, via $\Pr(Z_T|W_T)$, where $Z_{T,\{i,t\}^-}$ are community assignments of all nodes at all time steps except node i at time step t, and
   c. inferring best-fit parameters for the dynamic stochastic model with online learning and offline learning.

2. The method of claim 1, comprising generating community membership assignments for all individuals in the social network over all time steps.

3. The method of claim 1, comprising generating a collection of snapshot graphs for the dynamic social network.

4. The method of claim 1, comprising applying the community assignments for an individual to track his or her community membership evolution over time.

5. The method of claim 1, comprising applying the community assignments for all individuals at a given time step t to obtain an aggregated community structure at time t.

6. The method of claim 1, comprising applying the community assignments for all individuals at all time steps to obtain the communities and their evolutions.

7. The method of claim 1, comprising using either an offline or an online Bayesian inference learning algorithm to update the model.

8. The method of claim 1, comprising applying Gibbs sampling or simulated annealing algorithm to learn the model parameters.

9. The method of claim 1, comprising generating a dynamic stochastic model to model communities and their evolutions in a unified framework.

10. The method of claim 1, comprising applying the dynamic stochastic block model and a Bayesian inference to a collection of snapshot graphs.

11. The method of claim 1, comprising tracing and summarizing a community membership of a given individual.

12. The method of claim 1, comprising aggregating the individual community memberships at a given time step t into the community structure of the social network at time t.

13. The method of claim 1, comprising aggregating the individual community memberships over all time steps into the communities and their evolutions of the dynamic social network.

14. A system to find dynamic social networks, comprising:
  a. a unified framework with a dynamic stochastic block model to generate one or more dynamic social networks, wherein the model simultaneously captures communities and their evolutions, and
  b. a Gibbs sampling module or a simulated annealing module to learn the model parameters and to infer best-fit parameters for the dynamic stochastic model with online learning and offline learning, wherein the Gibbs sampling comprises a conditional probability of a community assignment of each node conditioned on the community assignments of other nodes as $\Pr(z_i^{(t)}|Z_{T,\{i,t\}^-}, W_T)$, via $\Pr(Z_T|W_T)$, where $Z_{T,\{i,t\}^-}$ are community assignments of all nodes at all time steps except node i at time step t.

15. The system of claim 14, comprising a module to generate community membership assignments for all individuals in the social network over all time steps.

16. The system of claim 14, wherein the model generates a collection of snapshot graphs for the dynamic social network.

17. The system of claim 14, wherein the community assignments for an individual is used to track his or her community membership evolution over time.

18. The system of claim 14, comprising a module to apply the community assignments for all individuals at a given time step t to obtain the aggregated community structure at time t.

19. The system of claim 14, wherein the community assignments for all individuals at all time steps are used to obtain the communities and their evolutions.

20. The system of claim 14, comprising either an offline or an online Bayesian inference learning algorithm to update the model.

* * * * *